United States Patent
Holcman et al.

(10) Patent No.: US 8,536,999 B2
(45) Date of Patent: Sep. 17, 2013

(54) METHOD FOR DYNAMIC CREATION OF A GEOFENCE IN A WIRELESS SYSTEM

(75) Inventors: Alejandro R. Holcman, San Diego, CA (US); Babak Aryan, San Diego, CA (US); Jack B. Steenstra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1277 days.

(21) Appl. No.: 12/334,950

(22) Filed: Dec. 15, 2008

(65) Prior Publication Data

US 2010/0017126 A1 Jan. 21, 2010

Related U.S. Application Data

(60) Provisional application No. 61/081,265, filed on Jul. 16, 2008.

(51) Int. Cl.
G08B 1/08 (2006.01)

(52) U.S. Cl.
USPC ............ 340/539.13; 455/456.1; 701/469

(58) Field of Classification Search
USPC ............ 340/539.13, 573.3; 342/357.33, 342/357.34; 455/456.1; 701/469
See application file for complete search history.

(56) References Cited

U.S. PATENT DOCUMENTS

| | | | |
|---|---|---|---|
| 5,461,390 A | 10/1995 | Hoshen | |
| 6,014,080 A | 1/2000 | Layson, Jr. | |
| 6,211,817 B1 | 4/2001 | Eschenbach | |
| 7,783,423 B2 * | 8/2010 | Verma et al. | 701/469 |
| 7,973,707 B2 * | 7/2011 | Verechtchiagine | 342/357.33 |
| 2002/0196151 A1 | 12/2002 | Troxler | |
| 2003/0078042 A1 | 4/2003 | Miriyala et al. | |
| 2005/0046567 A1 | 3/2005 | Mortenson et al. | |
| 2006/0099971 A1 | 5/2006 | Staton et al. | |
| 2006/0181411 A1 * | 8/2006 | Fast et al. | 340/539.13 |
| 2007/0176771 A1 | 8/2007 | Doyle | |
| 2010/0113061 A1 * | 5/2010 | Holcman | 455/456.1 |
| 2011/0140884 A1 * | 6/2011 | Santiago et al. | 340/539.13 |

FOREIGN PATENT DOCUMENTS

| | | |
|---|---|---|
| CN | 101051407 A | 10/2007 |
| JP | 2003281694 A | 10/2003 |
| JP | 2008524670 A | 7/2008 |
| JP | 2008524699 A | 7/2008 |
| KR | 20040045928 | 6/2004 |
| KR | 20070094893 A | 9/2007 |
| WO | WO2005078473 A1 | 8/2005 |
| WO | 2006052400 A1 | 5/2006 |
| WO | 2006065492 A2 | 6/2006 |

OTHER PUBLICATIONS

European Search Report—EP11164804—Search Authority—Munich—Aug. 1, 2011.
International Search Report and Written Opinion—PCT/US2009/050865, International Search Authority—European Patent Office—Feb. 15, 2010.

* cited by examiner

*Primary Examiner* — John A Tweel, Jr.
(74) *Attorney, Agent, or Firm* — Shyam K. Parekh (57) ABSTRACT

A method and apparatus for creating a dynamic GeoFence area by determining an instant reference point using a first set of pseudorange measurements received by a GeoFence device, defining the dynamic GeoFence area referenced to the instant reference point, determining a position fix using a second set of pseudorange measurements, and comparing the position fix to the dynamic GeoFence area. In one aspect, an alert message based on the comparison results is presented to a user.

45 Claims, 4 Drawing Sheets

METHOD FOR DYNAMIC CREATION OF A GEOFENCE IN A WIRELESS SYSTEM

CROSS-REFERENCE TO RELATED APPLICATIONS

This application claims priority under 35 U.S.C. §119(e) to provisional U.S. Patent Application 61/081,265 titled "METHOD FOR DYNAMIC CREATION OF A GEOFENCE IN A WIRELESS SYSTEM", filed on Jul. 16, 2008, the disclosure of which is expressly incorporated by reference herein in its entirety.

FIELD

This disclosure relates generally to apparatus and methods for wireless tracking of people, pets or assets. More particularly, the disclosure relates to dynamic creation of a GeoFence area in a wireless system.

BACKGROUND

GeoFence tracking is the monitoring of movement of targets such as personal assets, vehicles or personnel within a defined geographic boundary. GeoFence tracking is used to track and record the movement (such as entry or exit) of an assigned target from a geographic boundary and to alert a system user of the movement activities of the assigned target.

A GeoFence boundary is generally referenced to a fixed location. Here, the system user redefines the geographic boundary or the reference point for the geographic boundary for each different area it would like to monitor. Thus, a new GeoFence boundary is defined each time. In a fixed GeoFence boundary, the system user cannot track an assigned target relative to another assigned target if both assigned targets are moving. It is also difficult to determine if a moving target has entered and/or exited a geographic area surrounding another moving target.

SUMMARY OF THE DISCLOSURE

According to one aspect, a user activates a GeoFence device to automatically define a surrounding GeoFence area at his present location, eliminating the need for the user to look up his present location and program a GeoFence area.

According to one aspect, a method for creating a dynamic GeoFence area comprises determining an instant reference point using a first set of pseudorange measurements received by a GeoFence device; defining the dynamic GeoFence area referenced to the instant reference point; determining a position fix using a second set of pseudorange measurements; and comparing the position fix to the dynamic GeoFence (geofence) area.

According to another aspect, a method for creating a dynamic GeoFence area comprises determining an instant reference point using a first set of pseudorange measurements received by a GeoFence device; defining the dynamic GeoFence area referenced to the instant reference point; determining a position fix using a second set of pseudorange measurements; comparing the position fix to the dynamic GeoFence area; updating the position fix after a first wait time; updating the instant reference point after a second wait time and redefining the dynamic GeoFence area based on the updated instant reference point; and comparing the updated position fix to the redefined dynamic GeoFence area.

According to yet another aspect, a method for monitoring dynamic GeoFence areas comprises defining n quantity of dynamic GeoFence areas for n quantity of tracked devices, monitoring the n quantity of dynamic GeoFence areas to determine overlap between the n quantity of dynamic GeoFence areas, and presenting an alert message if at least one of the n quantity of dynamic GeoFence areas does not overlap with at least one other of the n quantity of dynamic GeoFence area.

According to yet another aspect, a GeoFence device comprises a SPS application & hardware unit for receiving a first set of pseudorange measurements; a processing unit for determining an instant reference point based on the first set of pseudorange measurements, wherein the processing unit further defines a dynamic GeoFence area based on the instant reference point; and an interface unit for receiving a position fix, and wherein the processing unit compares the position fix to the dynamic GeoFence area.

According to yet another aspect, a computer-readable medium including program code stored thereon comprises program code to determine an instant reference point using a first set of pseudorange measurements received by a GeoFence device; program code to define the dynamic GeoFence area referenced to the instant reference point; program code to determine a position fix using a second set of pseudorange measurements; and program code to compare the position fix to the dynamic GeoFence area.

It is understood that other aspects will become readily apparent to those skilled in the art from the following detailed description, wherein it is shown and described various aspects and features by way of illustration. The drawings and detailed description are to be regarded as illustrative in nature and not as restrictive.

DETAILED DESCRIPTION

The detailed description set forth below in connection with the appended drawings is intended as a description of various aspects of the present invention and is not intended to represent the only aspects in which the present invention may be practiced. Each aspect described in this disclosure is provided merely as an example or illustration of the present invention, and should not necessarily be construed as preferred or advantageous over other aspects. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

The various illustrative logical blocks, modules, and circuits described herein may be implemented or performed with one or more processors. A processor may be a general purpose processor, such as a microprocessor, a specific application processor such as a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, micro-controller, a state machine, a combination of discrete hardware components, or any combination thereof. The various illustrative logical blocks, modules, and circuits described herein may also include machine readable medium for storing software. The machine readable medium may also include one or more storage devices.

Figure 1:
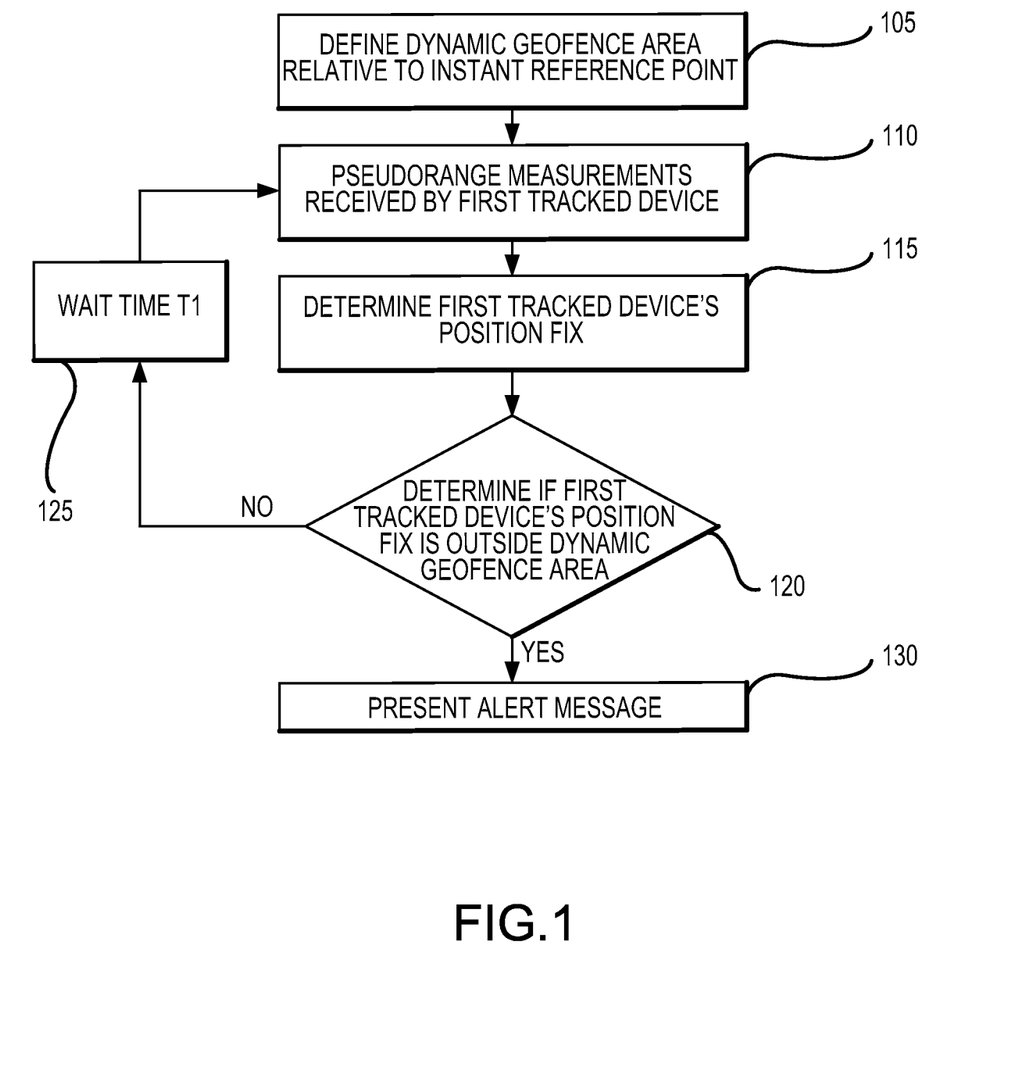
FIG. 1 is an exemplary flow diagram illustrating asset tracking.

FIG. 1 is an exemplary flow diagram illustrating asset tracking. One skilled in the art would understand that FIG. 1 presents an exemplary combination and ordering of the blocks. Various other combinations and orderings of the blocks presented in FIG. 1 will be readily apparent to those skilled in the art without departing from the spirit or scope of the disclosure.

In Block 105, a GeoFence device 1000 defines a dynamic GeoFence area relative to an instant reference point. The dynamic GeoFence area can be any polygon, the simplest being a circle. To define the dynamic GeoFence area relative to the instant reference point, the GeoFence device 1000 first obtains a position fix of the instant reference point. The dynamic GeoFence area is defined relative to the instant reference point by choosing a specific geographic boundary relative to the instant reference point and defining the dynamic GeoFence area as such. Here, the instant reference point, once established, does not move. The user defines the dynamic GeoFence area as suited to his needs at that time. In one aspect, the instant reference point may be any distance from the dynamic GeoFence area, including inside the dynamic GeoFence area, on the border of the dynamic GeoFence area or outside of the dynamic GeoFence area. One of the simplest arrangements for defining the dynamic GeoFence area relative to the instant reference point is having the instant reference point at the center of a circle, where the circle defines the dynamic GeoFence area with a specified radius. In one aspect, the shape and parameters of a dynamic GeoFence area are pre-programmed into the GeoFence device 1000. The user activates the GeoFence device 1000 to receive pseudorange measurements which are used to calculate a position fix. The position fix becomes the instant reference point which is then used to define the dynamic GeoFence area. In this aspect, the user need not determine his present location or how to define a GeoFence area. In one example, the user activates the GeoFence device and the GeoFence device performs the processes shown in FIG. 1.

In determining the position fix, pseudorange measurements are obtained. The pseudorange measurements can be obtained in a variety of modes, including but not limited to, stand-alone Satellite Positioning System (SPS) with no system assistance; MS-based (Mobile Station-based) SPS with system assistance for initialization; MS-assisted (Mobile Station-assisted) with an external entity performing the position fix; AFLT (Advanced Forward Link Trilateration) based on CDMA sectors triangulation; hybrid based on SPS and CDMA sectors triangulation; and sector center based on sector location. SPS includes Global Positioning System (GPS), Galileo, GLONASS, GNSS and any system that uses satellites from a combination of these systems or any future developed satellite systems. Furthermore, some positioning determination systems utilize pseudolites or a combination of satellites and pseudolites. Pseudolites are ground-based transmitters that broadcast a ranging code, such as a PN code (similar to a GPS or CDMA cellular signal), modulated on a carrier signal which may be synchronized with time provided by an SPS. Pseudolites are useful in situations where signals from an orbiting satellite might be unavailable. Additional terrestrial ranging sources, for example, such as AFLT may be used as alternative positioning systems. One skilled in the art would understand that other satellite based or terrestrial based sources for obtaining the pseudorange measurements are also available.

In Block 110, pseudorange measurements are received by the first tracked device 1006. In Block 115, the position fix of the first tracked device 1006 is determined based on the received pseudorange measurements. In one aspect, the first tracked device 1006 includes components for determining its position fix from the received pseudorange measurements. In another aspect, the first tracked device 1006 relays the pseudorange measurements to an external position determining entity 1008 and the position determining entity 1008 determines the position fix and relays the first tracked device's position fix back to the first tracked device 1006. In another aspect, the first tracked device 1006 relays the pseudorange measurements to the GeoFence device 1000 and the GeoFence device 1000 determines the first tracked device's position fix.

In Block 120 it is determined if the first tracked device's position fix is outside the dynamic GeoFence area. This determination could be made by the first tracked device 1006, an external device such as the position tracking management entity 620 or the GeoFence device 1000.

If the first tracked device's position fix is not outside the dynamic GeoFence area, proceed to Block 125. In Block 125, the process must wait a time T1 before proceeding back to Block 110 to receive the next set of pseudorange measurements. The time T1 is a system parameter that may be configured by the user, another operator, a system parameter or the application itself. In one aspect, time T1 represents a fixed time period between obtaining pseudorange measurements. In another aspect, time T1 is a variable time period. In one aspect, the time T1 is determined or altered by the measurement of a sensor, such as but not limited to, an inertial sensor. For example, in the event, movement of the first tracked device is detected, the time T1 is altered according to the magnitude of the movement measured. If the measurement of the inertial sensor indicates a great amount of movement in a relatively short amount of time, the time T1 may be reduced so that the next set of pseudorange measurements is immediately gathered. One skilled in the art would understand that a variety of sensors may be used without affecting the scope or spirit of the disclosure. For example, a sensor measurement indicating that a window in a car with the first tracked device has broken can be used to reduce the time T1. In another example, a sensor measures the battery power of the first tracked device and alters the time T1 accordingly. If the battery power is full, the time T1 may be shorter than if the battery power is nearly empty. In another example, a sensor senses daylight versus night time and alters the time T1 accordingly. In yet another example, the time T1 is adjusted according to the relative distance between the first tracked device and the boundary of the dynamic GeoFence area. For example, as the first tracked device approaches the boundary, the time T1 is reduced accordingly.

If the first tracked device's position fix is outside the dynamic GeoFence area, proceed to Block 130. In Block 130, an alert message is presented. In one aspect, the GeoFence device 1000 presents the alert message to the user, and the user has a choice to relay the alert message to other persons, devices or systems. In another aspect, the GeoFence device 1000 relays the alert message to other persons, devices or systems. Alternatively, an external device such as the position tracking management entity 620 relays the alert message to other persons, devices or systems. The GeoFence device 1000 and the first tracked device 1006 can be separate devices or a single device. In the example where the GeoFence device 1000 and the first tracked device 1006 are a single device, the alert message may be relayed to a separate device, for example a wireless phone, etc., in the user's possession. In one aspect, the first tracked device's position fix is updated periodically and compared to the dynamic GeoFence area. One skilled in the art would recognize that for some applications, the process described in FIG. 1 is repeated after the alert message in block 130 is presented.

One skilled in the art would recognize that the flow diagram of FIG. 1 may be used to track assets such as vehicles, jewelry or other tangible objects. For example, a user driving to a restaurant can park his car outside the restaurant and activate the GeoFence device 1000, setting the dynamic GeoFence area relative to the instant reference point that's created by activating the GeoFence device 1000. For example, by activating his GeoFence device 1000, a dynamic GeoFence area is created without the need for the user to determine his present location or for him to define the perimeter of his dynamic GeoFence area. In one aspect, the characteristics of the dynamic GeoFence area are predefined. In another aspect, simple parameters associated with the dynamic GeoFence area can be adjusted by the user. The user may fit his car with the first tracked device 1006. During his visit to the restaurant, if the car (i.e., the first tracked device) moves outside the dynamic GeoFence area, an alert message is sent to the GeoFence device 1000 (in the user's possession) to alert the user that his car has moved. In another example in which the GeoFence device and the first tracked device are a single device, the user activates the GeoFence device in his car to create a dynamic GeoFence area. If the car moves outside the dynamic GeoFence area, an alert message is sent to a device capable of displaying the alert message to the user.

Likewise, another example could be a user away on a business trip who wants to ensure that her jewelry stays within her house. The user could set the dynamic GeoFence area to be the perimeter of her house by activating the GeoFence device 1000 and setting the dynamic GeoFence area relative to the instant reference point that's created by activating the GeoFence device 1000. Here, the instant reference point could be a reference point within her house. The user may fit her jewelry with the first tracked device 1006. If the jewelry (i.e., the first tracked device) is moved outside the dynamic GeoFence area (e.g., the jewelry is taken outside her house), an alert message is sent to the GeoFence device 1000 to alert the user. In one example, the user then notifies the authorities that her jewelry had been removed from her house without her permission. In another example, the GeoFence device 1000 presents a second alert message to a third party, for example, police or security authorities. In addition, the first tracked device 1006 could send an alert message to the authorities directly. In one aspect, instead of monitoring assets, the first tracked device 1006 could be fitted on a person to monitor the person's movement relative to the dynamic GeoFence area.

Figure 2:
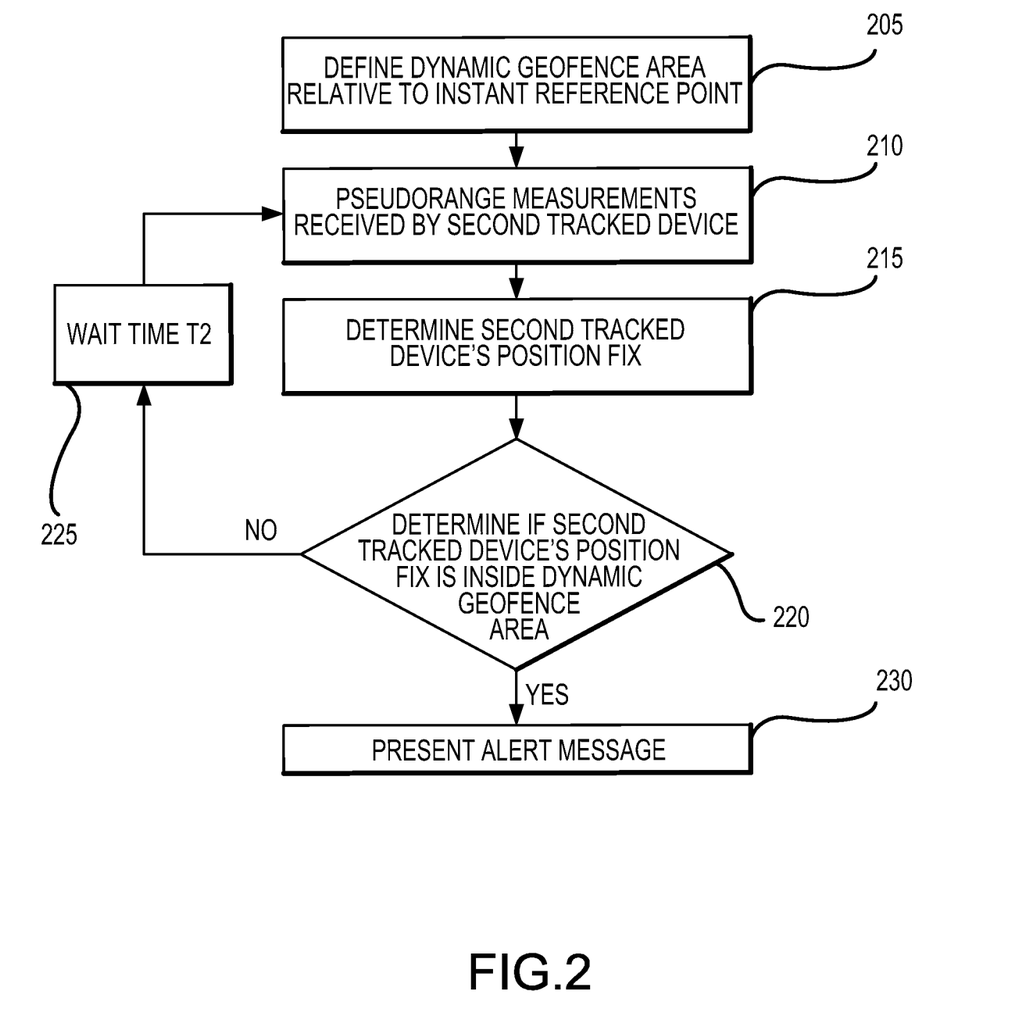
FIG. 2 is an exemplary flow diagram illustrating tracking a target to prevent the target from entering a restricted area.

FIG. 2 is an exemplary flow diagram illustrating tracking a target to prevent the target from entering a restricted area. One skilled in the art would understand that FIG. 2 presents an exemplary combination and ordering of the blocks. Various other combinations and orderings of the blocks presented in FIG. 2 will be readily apparent to those skilled in the art without departing from the spirit or scope of the disclosure.

Blocks 205 through 215 of FIG. 2 are functionally the same as Blocks 105 through 115 of FIG. 1, except the first tracked device 1006 is replaced by a second tracked device 1011. The user activates the GeoFence device 1000 to receive pseudorange measurements which are used to calculate a position fix. The position fix becomes the instant reference point which is then used to define the dynamic GeoFence area. In this aspect, the user need not determine his present location or how to define a GeoFence area. In one example, the user activates the GeoFence device and the GeoFence device performs the processes shown in FIG. 2.

In Block 22, it is determined if the second tracked device's position fix is inside the dynamic GeoFence area. In one aspect, this determination is made by the second tracked device 1011, or by an external device such as the position tracking management entity 620 or the GeoFence device 1000. If the second tracked device's position fix is not inside the dynamic GeoFence area, proceed to Block 225. In Block 225, the process must wait a time T2 before proceeding to Block 2210 to receive the next set of pseudorange measurements. The time T2 is a system parameter that may be configured by the user, another operator or the application itself. Time T2 sets the time interval between obtaining pseudorange measurements. If the second tracked device's position fix is inside the dynamic GeoFence area, proceed to Block 230. In Block 230, the alert message is presented. In one aspect, the GeoFence device 1000 presents the alert message to the user. The user may then present the alert message to other persons, devices, or systems. In another aspect, the GeoFence device 1000 relays the alert message to other persons, devices or systems. Alternatively, an external device such as the position tracking management entity 620 relays the alert message to other persons, devices or systems. Similar to time T1 time T2 could represent a fixed time period between obtaining pseudorange measurements or a variable time period dependent upon other parameters such as the examples (e.g., sensor measurements) discussed in the context of time T1. Similarly, the second tracked device 1011 and the GeoFence device 1000 could be two separate devices or a single device. In one aspect, the second tracked device's position fix is updated periodically and compared to the dynamic GeoFence area. One skilled in the art would recognize that for some applications, the process described in FIG. 2 is repeated after the alert message in block 230 is presented.

One skilled in the art would recognize that the flow diagram of FIG. 2 may be used to track a target to prevent the target from entering a restricted area. For example, a mother at a resort may wish to prevent her teenager from entering the bar area of the resort. The mother enters the bar area and activates her GeoFence device 1000 to create a dynamic GeoFence area around the restricted bar area. In one example, the teenager carries a second tracked device 1011. If the second tracked device position 1011 moves inside the dynamic GeoFence area, an alert message is presented to the mother (for example, through her GeoFence device). In another example, the mother enters the bar area and activates the GeoFence device 1000 to create a dynamic GeoFence area around the bar area. The mother then gives the GeoFence device 1000 to her teenager. If the teenager (i.e., the GeoFence device 1000) enters the bar area (i.e., the dynamic GeoFence area), an alert message is presented to the mother through a separate device. One skilled in the art would understand that the flow diagrams of FIGS. 1 and 2 are not limited to the examples presented, but can encompass numerous examples for monitoring the movement of a target relative to a dynamic GeoFence area.

Figure 3:
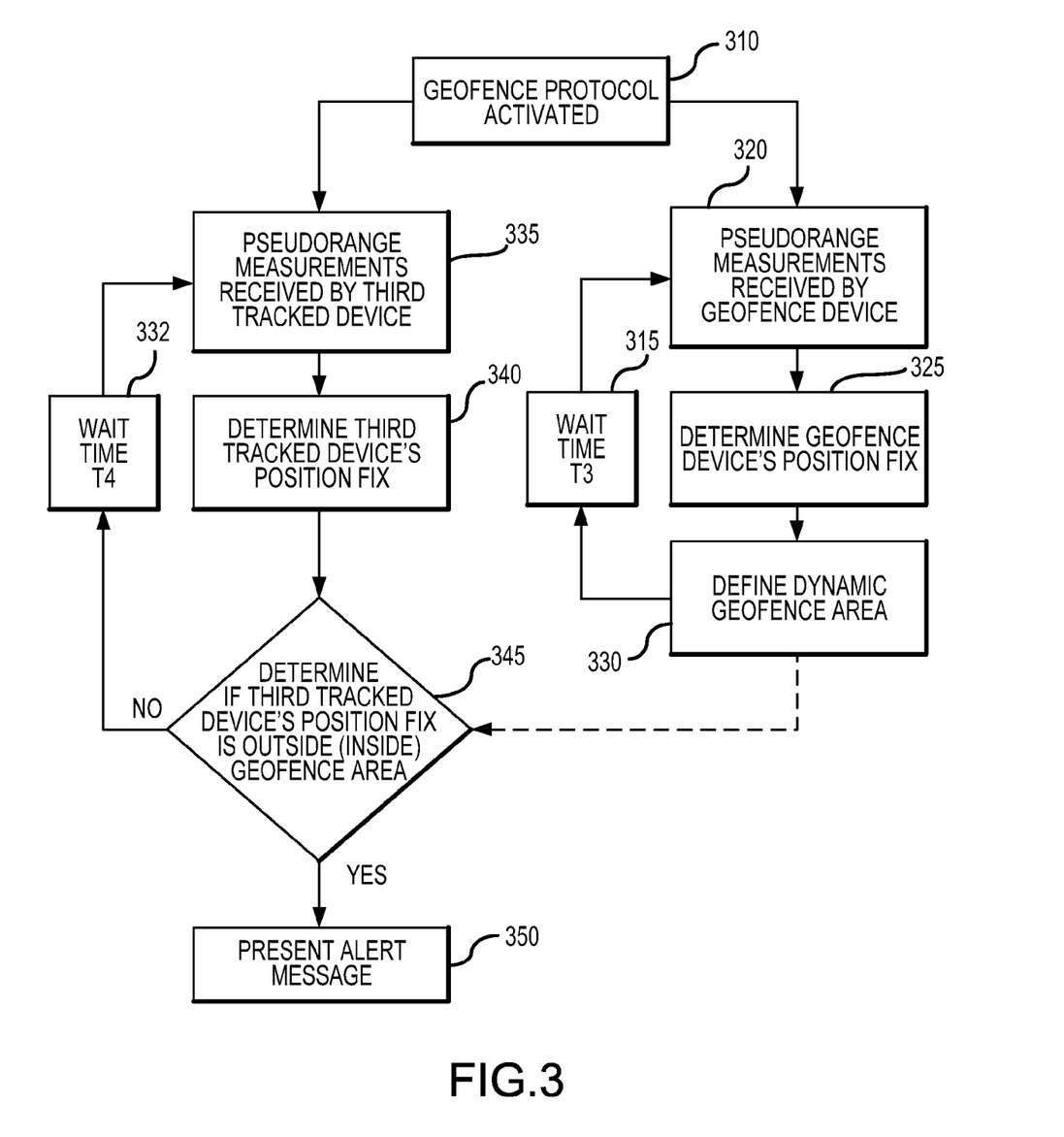
FIG. 3 is an exemplary flow diagram illustrating tracking multiple moving targets using a dynamic GeoFence.

FIG. 3 is an exemplary flow diagram illustrating tracking multiple targets using a dynamic GeoFence. One skilled in the art would understand that FIG. 3 presents an exemplary combination and ordering of the blocks. Various other combinations and orderings of the blocks presented in FIG. 3 will be readily apparent to those skilled in the art without departing from the spirit or scope of the disclosure.

In Block 310, the GeoFence device 1000 checks to verify that a GeoFence protocol has been activated. The user, for example, may activate the GeoFence protocol by pressing a button on the GeoFence device 1000. In one aspect, when the GeoFence device 1000 is ON, it checks periodically to verify that the GeoFence protocol has been activated. One skilled in the art would understand that how often the periodic check is made is a system parameter that may be configured by the user, another operator or the application itself. The user activates the GeoFence device 1000 to receive pseudorange measurements which are used to calculate a position fix. The position fix becomes the instant reference point which is then used to define the dynamic GeoFence area. In this aspect, the user need not determine his present location or how to define a GeoFence area. In one example, the user activates the GeoFence device and the GeoFence device performs the processes shown in FIG. 3.

If the GeoFence protocol is activated, proceed to Blocks 335 and 320. In Block 335, a third tracked device 1020 receives pseudorange measurements and in Block 340, the third tracked device's position fix is determined based on the pseudorange measurements received. In one aspect, the third tracked device 1020 may include components to determine its position fix. In another aspect, the third tracked device 1020 relays the pseudorange measurements to an external device such as the position determining entity 1008, and the position determining entity 1008 determines the third tracked device's position fix. In another aspect, the third tracked device 1020 relays the pseudorange measurements to the GeoFence device 1000 and the GeoFence device 1000 determines the third tracked device's position fix. From Block 340, proceed to Block 345.

In Block 320, pseudorange measurements are received by the GeoFence device 1000. In Block 325, the GeoFence device's position fix is determined using the received pseudorange measurements. In one aspect, the GeoFence device 1000 includes components for determining its position fix. In another aspect, the GeoFence device 1000 relays the pseudorange measurements to an external device such as the position determining entity 1008, and the position determining entity 1008 determines the GeoFence device's position fix.

In one aspect, the GeoFence device's position fix defines the instant reference point. In Block 330, the dynamic GeoFence area is defined relative to the instant reference point. In Block 330, the process waits a time T3 before proceeding back to Block 320 to receive the next set of pseudorange measurements. Similar to time T1, time T3 could represent a fixed time period between obtaining pseudorange measurements or a variable time period dependent upon other parameters such as the examples (e.g., sensor measurement) discussed in the context of time T1.

In Block 345, determine if the third tracked device's position fix is outside the dynamic GeoFence area defined in Block 330. This determination could be made by the third tracked device 1020, an external device such as the position tracking management entity 620 or the GeoFence device 1000. If the third tracked device 1020 is outside the dynamic GeoFence area, proceed to Block 350 where an alert message is presented. In one aspect, the GeoFence device 1000 presents the alert message to the user. In another aspect, the alert message is presented to other persons, devices or systems. If the third tracked device position 1020 is not outside the dynamic GeoFence area, the process waits a time T4 before proceeding back to Block 335 to receive the next set of pseudorange measurements. Similar to time T1, time T4 could represent a fixed time period between obtaining pseudorange measurements or a variable time period dependent upon other parameters such as the examples (e.g., sensor measurement) discussed in the context of time T1. In one example, time T4 is equal to time T3.

In one aspect, the third tracked device's position fix is updated periodically and compared to the dynamic GeoFence area. In one aspect, the instant reference point is updated periodically to redefine the dynamic GeoFence area based on the updated first instant reference point. Once the dynamic GeoFence area is redefined, compare the updated position fix to the redefined GeoFence area. One skilled in the art would recognize that for some applications, the process described in FIG. 3 is repeated after the alert message in block 350 is presented.

One skilled in the art would recognize that the flow diagram of FIG. 3 may be used to track multiple targets using a dynamic GeoFence, such use is described later. For example, a mother may desire to keep her child (or children in the case of tracking multiple targets) near her while shopping in a shopping mall. The mother sets the dynamic GeoFence area around her by activating her GeoFence device 1000 and defining the dynamic GeoFence area relative to her instant reference point. In one example, the mother defines the dynamic GeoFence area as a perimeter of X feet (for example, 20 feet) from her GeoFence device 1000. As the mother moves (i.e., GeoFence device 1000 moves) around the shopping mall, the instant reference point is updated with new position fixes, and the GeoFence device 1000 periodically redefines the dynamic GeoFence area relative to the updated instant reference point as long as the GeoFence protocol is activated. The mother could fit the child with the third tracked device 1020. If the child (i.e., the third tracked device's position fix) moves outside the dynamic GeoFence area, an alert message is sent to the GeoFence device 1000, alerting the mother that the child had strayed past the allowed perimeter. In one aspect, the mother could then consult the GeoFence device 1000 to view a graphical display of the dynamic GeoFence area and the child's third tracked device's position fix in order to locate her child.

In another example, a law enforcement officer desires to monitor a person restrained (a.k.a. "restrained person") by a restraining order. The law enforcement officer could establish the dynamic GeoFence area around the person protected (a.k.a. "protected person") by the restraining order by activating the GeoFence device 1000 and setting the dynamic GeoFence area relative to the instant reference point of the protected person. As the protected person moves, the GeoFence device 1000 periodically redefines the dynamic GeoFence area relative to the updated instant reference point of the protected person. The law enforcement officer could fit the restrained person with the third tracked device 1020. If the restrained person (i.e., the third tracked device) moves within the dynamic GeoFence area, the GeoFence device 1000 would send an alert message to the law enforcement officer, alerting them that the restrained person has violated the restraining order. In one aspect, the law enforcement officer could then consult a graphical display of the dynamic GeoFence area and the restrained person's position fix (i.e., third tracked device's position fix) in order to locate the restrained person for arrest. In one aspect, the alert message is also presented to the protected person (i.e., the GeoFence device) to alert him that the restrained person has entered the GeoFence area. In this example, Block 345 would determine if the third tracked device's position fix is inside (instead of outside) the dynamic GeoFence area.

Figure 4:
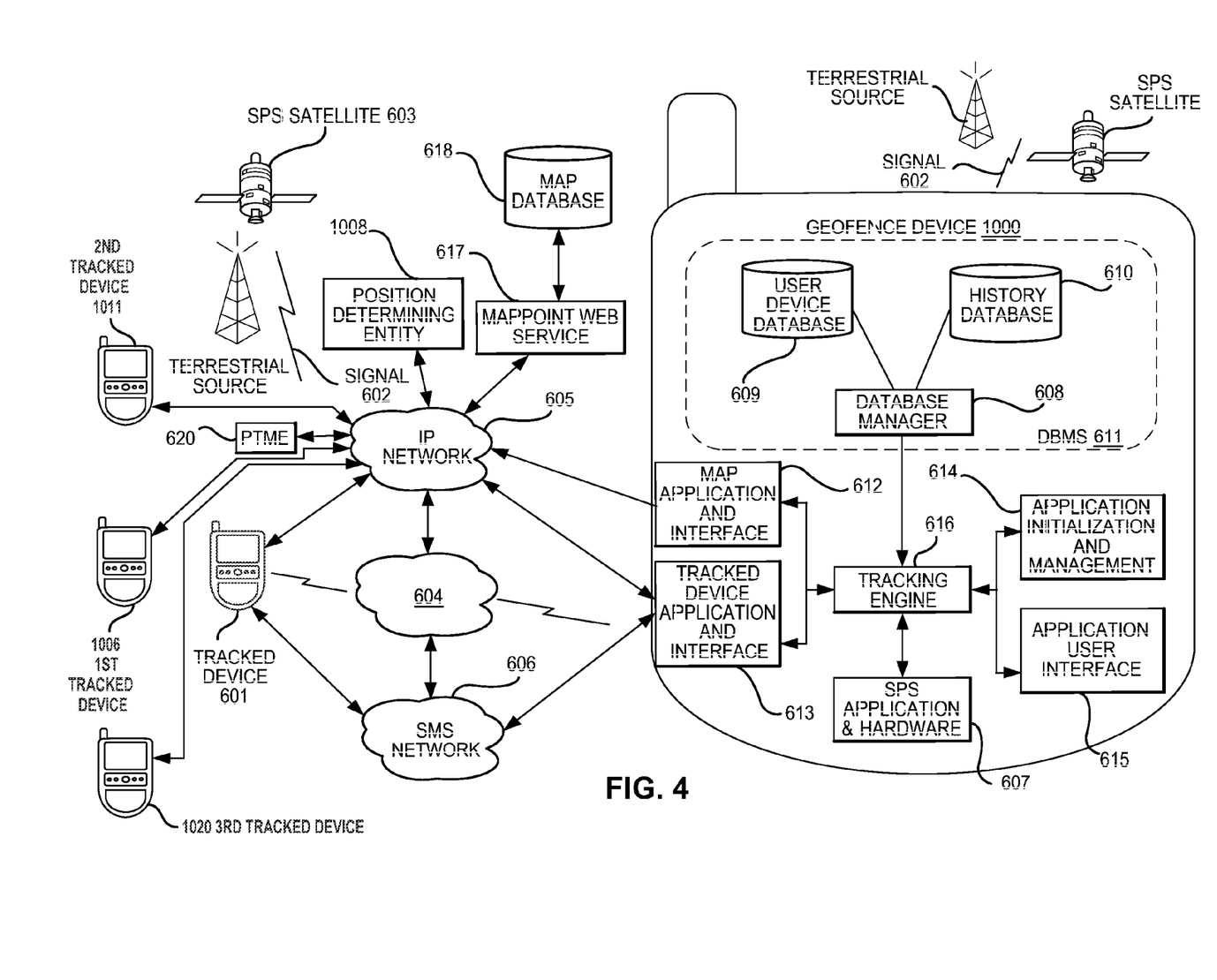
FIG. 4 is block diagram illustrating an exemplary architecture of a dynamic GeoFence in a wireless system.

FIG. 4 is a block diagram illustrating an exemplary architecture of a dynamic GeoFence in a wireless system which includes a tracked device 601 and a GeoFence device 1000. The depicted geometry may be adapted to perform any one of the exemplary flow diagrams of FIGS. 1 through 3, or any number of other processes within the scope of this disclosure. One skilled in the art would understand that FIG. 4 presents an exemplary combination and ordering of the blocks. Various other combinations and orderings of the blocks presented in FIG. 4 will be readily apparent to those skilled in the art without departing from the spirit or scope of the disclosure.

In one aspect, the tracked device 601, for example, comprises an LDC ("Low Duty Cycle") transceiver. In another aspect, the tracked device 601 may also comprise a wireless mobile device such as, but not limited to, a Palm Treo 700w or other mobile devices by Research-in-Motion (Blackberry), Apple, E-TEN, HTC, Nokia, Motorola, Samsung, Sony Ericsson or others, etc. Selection of the tracked device 601 is a system parameter that may be selected by the user, another operator or the system designer.

In one aspect, the GeoFence device 1000 represents a wireless mobile device capable of storing and executing applications. One of ordinary skill in the art would recognize that the GeoFence device 1000 and its configuration as shown in FIG. 4 could also be the configuration of the tracked device 601. In FIG. 4, the Palm Treo 700w is shown as one example. Other alternative mobile devices include, but are not limited to, devices from Research-in-Motion (Blackberry), Apple, E-TEN, HTC, Nokia, Motorola, Samsung, Sony Ericsson or others etc. These devices run on operating systems that may include, for example, Symbian (Symbian, Inc.), Windows Mobile (Microsoft), Blackberry (Research-in-Motion), Linux, Palm (PalmSource/Access), OS-X (Apple) or others etc. In another aspect, the GeoFence device 1000 is an LDC transceiver.

In one example, the GeoFence device 1000 comprises a SPS application & hardware 607 which receives the pseudorange measurements. A database manager 608, a user device database 609 and/or a history database 610 comprise a Database Management System ("DBMS") 611 within the GeoFence device 1000. The DBMS 611 provides storage for map display, data associated with the dynamic GeoFence area and/or the position fixes. Additionally, the DBMS 611 may also provide storage for system applications that run on the GeoFence device 1000. In one example, the GeoFence device 1000 includes an application initialization & management unit 614 and an application user interface unit 615. Working in conjunction, the application initialization & management unit 614 and the application user interface unit 615 initialize, control and manage system applications that run on the GeoFence device 1000. The GeoFence device 1000 may implement this functionality in operating systems including, but not limited to Symbian, Windows Mobile, Blackberry, Linux, Palm, OS-X or others etc. One skilled in the art would understand that the operating systems listed are merely examples and that other operating systems may be used without affecting the spirit and scope of this disclosure. Alternatively, all or some of the initialization, control and management of applications may be performed separately from the specific operating system present in the GeoFence device 1000. In one example, a tracking engine 616 is connected to the database manager 608, the application initialization & management unit 614, the application user interface unit 615, the map application & interface unit 612 and the tracked device application & interface unit 613. The tracking engine 616, for example, synthesizes the data associated with the dynamic GeoFence area and the position fixes to calculate proximity of a position fix to a dynamic GeoFence area. In one aspect, the tracking engine 616, in conjunction with the internal chipset of the GeoFence device 1000, synthesizes the data obtained and displays a map, the dynamic GeoFence area and/or the position fixes on a user display device. One skilled in the art would understand that the components within the GeoFence device 1000 (as shown in FIG. 4) are provided only as examples. The GeoFence device 1000 can include other components not shown in FIG. 4 or not include some of the components shown in FIG. 4 without departing from the spirit and scope of the disclosure. In one aspect, the GeoFence device 1000 includes a processing unit for determining the instant reference point based on the pseudorange measurements and for defining the dynamic GeoFence area based on the instant reference point. In one aspect, the processing unit compares the position fix to the dynamic GeoFence area and presents the comparison results to the user, other persons, other devices and/or other systems. In one aspect, the processing unit includes one or more of the following: database manager 608, user device database 609, history database 610, application initialization & management unit 614, application user interface unit 615, map application & interface unit 612, tracked device application & interface unit 613, tracking engine 616 or SPS application and hardware 607.

As shown in FIG. 4, the tracked device 601 is connected to a mobile network 604. The mobile network 604, which is used in one aspect to relay information to and from the tracked device 601, may comprise of CDMA, TDMA, GSM or any other wireless air interfaces. Also, in one aspect, the mobile network 604 is connected to an IP ("Internet Protocol") network 605 and a SMS ("Short Message Service") network 606. The IP network 605 is a system by which data is sent from one host to another host via a network (e.g., the Internet). The SMS network 606 sends short text messages between devices. In one aspect, the mobile network 604 relays data from the tracked device 601 to the IP network 605 and the SMS network 606. In another aspect, the tracked device 601 is directly connected to the IP network 605 and to the SMS network 606, as shown in FIG. 4. In one aspect, the GeoFence device 1000 is similarly connected to the mobile network 604, the IP network 605 and/or the SMS network 606. Or, the GeoFence device 1000 may be connected to the IP network 605 and SMS network 606 through the mobile network 604. The connection of the tracked device and/or GeoFence device to one or more of the mobile network 604, SMS network 606 or IP network 605 allows for the flexibility of relaying information between devices.

In one example, the GeoFence device (through its map application & interface 612) is connected to the IP network 605 or the mobile network 604. A Mappoint Web Service 617 is also connected to the IP network 605 or the mobile network 604. The Mappoint Web Service 617 is able to relay information from its map database 618 to the GeoFence device 1000. Additionally, position fix data can be relayed via the IP network 605 or the mobile network 604 from the tracked device 601 or the position determining entity 1008 to the GeoFence device 1000.

In one example, the tracked device 601 sends a SMS text message via the SMS network 606 or the mobile network 604 to the GeoFence device 1000 or vice versa. Alternatively, the position tracking management entity 620 may send a SMS text message to the GeoFence device 1000 or tracked device 601. Upon receiving the SMS text message 1039, the GeoFence device 1000 or the tracked device 601 displays the SMS text message 1039 for the user.

In one aspect, the tracked device 601 receives pseudorange measurements from the SPS satellite and/or terrestrial sources and calculates its position fix. Alternatively, the tracked device 601 relays the pseudorange measurements to the GeoFence device 1000 or the position determining entity 1008, and the GeoFence device 1000 or the position determining entity 1008 calculates the position fix of the tracked device 601. Similarly, the GeoFence device receives pseudorange measurements from the SPS satellite or terrestrial sources 603 and calculates its position fix. Alternatively, it relays the pseudorange measurements to the position determining entity 1008, and the position determining entity 1008 calculates the position fix of the GeoFence device 1000. In one aspect, the IP Network 605 is connected to a position tracking & management entity (PTME) 620. In one example, the PTME 620 receives position fixes from the GeoFence device 1000, tracked device 601, and/or position determining entity 1008. The PTME 620 defines the dynamic GeoFence area and compares the position fixes to the dynamic GeoFence area to determine if the position fix is outside or inside. The determination is then relayed to one or more of the GeoFence device 1000, tracked device 601 or another designated device. In this example, the GeoFence device 1000 and/or tracked device 601 are simple devices for relaying data and displaying messages from PTME 620.

In one aspect, the PTME 620 is used to monitor the movements of a set of targets. Each target in the set is fitted with a tracked device 601. A dynamic GeoFence area is defined for each tracked device. Thus, for n quantities of tracked devices, there are n quantities of dynamic GeoFence areas respectively. The dynamic GeoFence areas are individually updated according to the individual movements of each of the targets. The PTME 620 monitors each of the dynamic GeoFence areas to determine overlap between the dynamic GeoFence areas. In one example, if any one of the dynamic GeoFence areas does not overlap with at least one other dynamic GeoFence area, an alert message is presented to a user. In one example, there are n quantities of targets and n quantities of tracked devices with corresponding n quantities of dynamic GeoFence areas where n can be any quantity. In one example, each target is a child. If one child strays from the group (i.e., his associated dynamic GeoFence area no longer overlaps with any other child's dynamic GeoFence area), an alert message is presented to a guardian (i.e., the user). In this example, the tracked devices are simple devices for receiving pseudorange measurements and relaying the pseudorange measurements to the position determining entity 1008 for determining position fixes and relaying position fixes to the PTME 620 for defining dynamic GeoFence areas.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for creating a dynamic geo-fence area comprising:
    determining an instant reference point using a first set of pseudorange measurements received by a geo-fence device;
    defining the dynamic geo-fence area referenced to the instant reference point;
    determining a position fix using a second set of pseudorange measurements, wherein the second set of pseudorange measurements is obtained by a tracked device separate from the geo-fence device; and
    comparing the position fix to the dynamic geo-fence area.

2. The method of claim 1 further comprising presenting an alert message.

3. The method of claim 1 further comprising activating the geo-fence device to perform the processes recited in claim 1.

4. The method of claim 1 wherein the determining the instant reference point and the determining the position fix are performed by a position determining entity.

5. The method of claim 4 wherein the defining the dynamic geo-fence area is performed by a position tracking and management entity.

6. The method of claim 5 wherein the comparing the position fix to the dynamic geo-fence area is performed by the position tracking and management entity.

7. The method of claim 2 wherein the alert message is presented when the position fix is outside the dynamic geo-fence area.

8. The method of claim 2 wherein the alert message is presented when the position fix is inside the dynamic geo-fence area.

9. The method of claim 1 further comprising updating the position fix and comparing the updated position fix to the dynamic geo-fence area.

10. The method of claim 9 further comprising waiting a wait time before updating the position fix.

11. The method of claim 10 wherein the wait time is a variable time period.

12. The method of claim 10 wherein the wait time is a variable time period dependent upon at least one sensor measurement.

13. The method of claim 1 further comprising updating the instant reference point.

14. The method of claim 13 further comprising redefining the dynamic geo-fence area based on the updated instant reference point.

15. The method of claim 14 further comprising updating the position fix.

16. The method of claim 15 further comprising comparing the updated position fix to the redefined dynamic geo-fence area.

17. A method for creating a dynamic geo-fence area comprising:
    determining an instant reference point using a first set of pseudorange measurements received by a geo-fence device;
    defining the dynamic geo-fence area referenced to the instant reference point;
    determining a position fix using a second set of pseudorange measurements, wherein the second set of pseudorange measurements is obtained by a tracked device separate from the geo-fence device;
    comparing the position fix to the dynamic geo-fence area;
    updating the position fix after a first wait time;
    updating the instant reference point after a second wait time and redefining the dynamic geo-fence area based the updated instant reference point; and
    comparing the updated position fix to the redefined dynamic geo-fence area.

18. The method of claim 17 wherein the first wait time equals the second wait time.

19. The method of claim 17 wherein an alert message is presented when the position fix is outside the dynamic geo-fence area.

20. The method of claim 17 wherein an alert message is presented when the position fix is inside the dynamic geo-fence area.

21. The method of claim 17 wherein the determining the instant reference point and determining the position fix are performed by a position determining entity.

22. The method of claim 21 wherein the defining the dynamic geo-fence area is performed by a position tracking and management entity.

23. The method of claim 22 wherein the comparing the position fix to the dynamic geo-fence area is performed by the position tracking and management entity.

24. The method of claim 17 further comprising activating the geo-fence device to perform the processes recited in claim 17.

25. A method for monitoring dynamic geo-fence areas comprising:
    defining n quantity of dynamic geo-fence areas for n quantity of tracked devices;
    monitoring the n quantity of dynamic geo-fence areas to determine overlap between the n quantity of dynamic geo-fence areas; and
    presenting an alert message if at least one of the n quantity of dynamic geo-fence areas does overlap with at least one other of the n quantity of dynamic geo-fence area.

26. The method of 25 wherein the defining n quantity of dynamic geo-fence areas is performed by a position tracking and management entity.

27. The method of 26 wherein the monitoring the n quantity of dynamic geo-fence areas is performed by the position tracking and management entity.

28. A geo-fence device comprising:
    a hardware unit for receiving a first set of pseudorange measurements;
    a processing unit for determining an instant reference point based on the first set of pseudorange measurements, wherein the processing unit further defines a dynamic geo-fence area based on the instant reference point; and
    an interface unit for receiving a position fix, wherein the position fix is obtained by a tracked device separate from the geo-fence device, wherein the processing unit compares the position fix to the dynamic geo-fence area.

29. The geo-fence device of claim 28 wherein the processing unit presents an alert message on the basis of the comparing.

30. The geo-fence device of claim 28 further comprising a map application & interface unit for receiving map information for use in defining the dynamic geo-fence area.

31. The geo-fence device of claim 28 further comprising a database management system for storing one or more of a map data, data associated with the dynamic geo-fence area or the position fix.

32. The geo-fence device of claim 31 further comprising a tracking engine for synthesizing the data associated with the dynamic geo-fence area and the position fix, and for calculating proximity of the position fix to the dynamic geo-fence area.

33. A computer-readable medium including program code stored thereon comprising:
    program code to determine an instant reference point using a first set of pseudorange measurements received by a geo-fence device;
    program code to define the dynamic geo-fence area referenced to the instant reference point;
    program code to determine a position fix using a second set of pseudorange measurements, wherein the second set of pseudorange measurements is obtained by a tracked device separate from the geo-fence device; and
    program code to compare the position fix to the dynamic geo-fence area.

34. The computer-readable medium of claim 33 further comprising program code to update the position fix and to compare the updated position fix to the dynamic geo-fence area.

35. The computer-readable medium of claim 33 further comprising program code to update the instant reference point.

36. The computer-readable medium of claim 35 further comprising program code to redefine the dynamic geo-fence area based on the updated instant reference point.

37. The computer-readable medium of claim 36 further comprising program code to update the position fix.

38. The computer-readable medium of claim 37 further comprising program code to compare the updated position fix to the redefined dynamic geo-fence area.

39. An apparatus, comprising:
    means for determining an instant reference point using a first set of pseudorange measurements received by a geo-fence device;
    means for defining the dynamic geo-fence area referenced to the instant reference point;
    means for determining a position fix using a second set of pseudorange measurements, wherein the second set of pseudorange measurements is obtained by a tracked device separate from the geo-fence device; and
    means for comparing the position fix to the dynamic geo-fence area.

40. The apparatus of claim 39, further comprising:
    means for updating the position fix after a first wait time;
    means for updating the instant reference point after a second wait time and redefining the dynamic geo-fence area based the updated instant reference point; and
    means for comparing the updated position fix to the redefined dynamic geo-fence area.

41. An apparatus, comprising:
    means for defining n quantity of dynamic geo-fence areas for n quantity of tracked devices;
    means for monitoring the n quantity of dynamic geo-fence areas to determine overlap between the n quantity of dynamic geo-fence areas; and
    means for presenting an alert message if at least one of the n quantity of dynamic geo-fence areas does overlap with at least one other of the n quantity of dynamic geo-fence area.

42. A method for monitoring dynamic geo-fence areas comprising:
    defining n quantity of dynamic geo-fence areas for n quantity of tracked devices;
    monitoring the n quantity of dynamic geo-fence areas to determine overlap between the n quantity of dynamic geo-fence areas; and
    presenting an alert message if at least one of the n quantity of dynamic geo-fence areas does not overlap with at least one other of the n quantity of dynamic geo-fence area.

43. The method of 42 wherein the defining n quantity of dynamic geo-fence areas is performed by a position tracking and management entity.

44. The method of 43 wherein the monitoring the n quantity of dynamic geo-fence areas is performed by the position tracking and management entity.

45. An apparatus, comprising:
- means for defining n quantity of dynamic geo-fence areas for n quantity of tracked devices;
- means for monitoring the n quantity of dynamic geo-fence areas to determine overlap between the n quantity of dynamic geo-fence areas; and
- means for presenting an alert message if at least one of the n quantity of dynamic geo-fence areas does not overlap with at least one other of the n quantity of dynamic geo-fence area.

* * * * *